(12) United States Patent
Swift (10) Patent No.: US 7,047,164 B1
(45) Date of Patent: May 16, 2006

(54) PORT TREND ANALYSIS SYSTEM AND METHOD FOR TRENDING PORT BURST INFORMATION ASSOCIATED WITH A COMMUNICATIONS DEVICE

(75) Inventor: Larry Swift, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 730 days.

(21) Appl. No.: 09/580,700

(22) Filed: May 30, 2000

(51) Int. Cl.
G06F 7/60 (2006.01)

(52) U.S. Cl. .......................... 703/2; 345/440; 370/252; 370/390

(58) Field of Classification Search .................... 703/2; 370/252, 390, 233, 395.1, 321, 250, 330, 370/478; 345/440; 702/179, 122, 170, 191; 709/226, 230; 455/121, 17.14
See application file for complete search history.

(56) References Cited

U.S. PATENT DOCUMENTS

| | | | | |
|---|---|---|---|---|
| 4,330,857 A | * | 5/1982 | Alvarez, III et al. | 370/321 |
| 5,699,346 A | * | 12/1997 | VanDervort | 370/233 |
| 5,867,483 A | * | 2/1999 | Ennis, Jr. et al. | 370/252 |
| 5,950,147 A | * | 9/1999 | Sarangapani et al. | 702/179 |
| 6,144,662 A | * | 11/2000 | Colmant et al. | 370/390 |
| 6,167,310 A | * | 12/2000 | Grevious | 607/32 |
| 6,320,585 B1 | * | 11/2001 | Engel et al. | 345/440 |
| 2002/0018473 A1 | * | 2/2002 | Hassell et al. | 370/395.1 |

OTHER PUBLICATIONS

Chien et al., "Dynamic resouce allocation for self-similar traffic in ATM network", IEEE 1999.*
Adas, "Using Adaptive linear prediction to support real time VBR video under RCBR network service model", IEEE 1998.*
Tsingotjidis et al., "Estimation and prediction approach to congestion control in ATM networks", IEEE 1994.*

* cited by examiner

Primary Examiner—Paul L. Rodriguez
Assistant Examiner—K Thangavelu
(74) Attorney, Agent, or Firm—Thomas, Kayden, Horstemeyer & Risley LLP (57) ABSTRACT

A system and method are disclosed for analyzing burst statistics from a communications network switch port transmitting data in a bursty communication system, where the burst statistics have been classified according to pre-defined burst ranges and where each burst range corresponds to a predetermined percentage range of the rated port speed, storing the burst statistics, specifying a report period of interest, specifying a plurality of summary periods, retrieving the burst statistics from storage, trending the information to predict future port speed requirements, and then recommending the magnitude of any port speed changes.

31 Claims, 5 Drawing Sheets

PORT TREND ANALYSIS SYSTEM AND METHOD FOR TRENDING PORT BURST INFORMATION ASSOCIATED WITH A COMMUNICATIONS DEVICE

TECHNICAL FIELD

The present invention relates generally to data communication management systems, and more particularly, to a system and method for automatically determining a recommended digital transmitter/receiver device size or capacity, such as for a network switch or a relay device in a frame relay network, by analyzing historical information regarding transmitted and received burst information and by recommending adjustments to the device size or capacity based on the analysis.

BACKGROUND OF THE INVENTION

In the field of data communications, communication equipment such as a modem, a data service unit (DSU), or a channel service unit (CSU) is used to convey information from one location to another. Digital technology now enables modems or other communication devices, such as network switches, frame relay data service units (DSU's), frame relay access units (FRAU's), and asynchronous transfer mode (ATM) communication devices to communicate large amounts of data in a packetized digital format. This packetized digital communication format generally adheres to a model, such as the well known Open Systems Interconnect (OSI) seven-layer model, which specifies the parameters and conditions under which information is formatted into a digital data packet and transferred over a communications network.

Frame-relay networks, well known in the art, are one implementation of a packet-switching network. A packet-switching network allows multiple users to share data network facilities and bandwidth, as contrasted with a circuit-switching network which provides a specific amount of dedicated bandwidth to each user. Packet switches divide bandwidth into connectionless, virtual circuits. A virtual circuit can be a permanent virtual circuit (PVC) or a switched virtual circuit (SVC). As is well known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay systems generally operate within layer 2 (the data link layer) of the OSI model, and are an improvement over previous packet switching techniques, such as X.25, in that a frame relay system requires significantly less control overhead.

In frame relay networks, as in other communication networks, access to the frame relay network is provided by a network service provider (NSP). These NSPs generally provide the communication and switching facilities over which the above-mentioned communication devices operate. Typically, an end user contracts with an NSP for network services. An example of such a network is a public switched service network. An example of a public switched network is the public switched telephone network (PSTN) or a public data network (PDN). These public networks typically sell network services, in the form of connectivity, to end users.

A user may purchase a particular level of service from the NSP. This level of service can be measured by, for example, network availability as a percentage of total time on the network, the amount of data actually delivered through the network compared to the amount of data attempted or possibly the network latency, or the amount of time it takes for a particular communication to traverse the network. Often, for example, an NSP may provision services to an end user by specifying a committed information rate (CIR). The CIR is the minimum data communication rate that the NSP guarantees to the user. The CIR is typically some fraction of the total available access line rate of the particular service being provisioned. For example, in a frame relay network, the access line rate may be 1536000 bits/second (T1 rate including 24 64-kilobit (KB) channels for a total of 1.544 megabits/second (MB/s) including 8 KB signaling), while the CIR may be 48000 bytes/second (384000 bits/second (b/s)). That is, for this example, the NSP may guarantee a communication rate of 384000 b/s, while the total available line rate may be 1536000 b/s.

Figure 1:
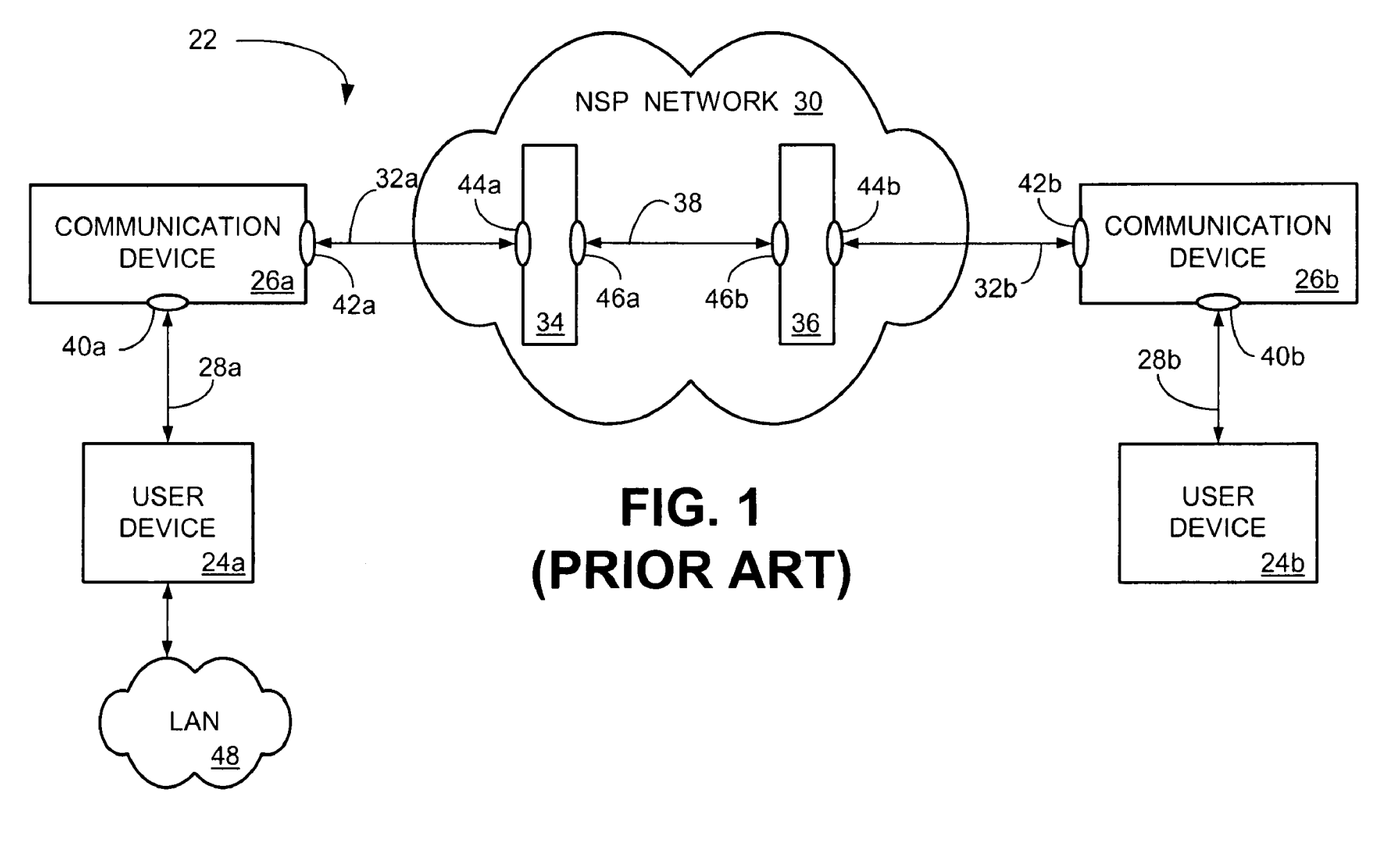
FIG. 1 is a block diagram illustrating a prior art communication environment.

FIG. 1 shows a communication environment 22 in which a plurality of user devices 24a and 24b reside. Each user device 24a and 24b, are connected to a communication device 26a and 26b, respectively, such as a frame relay access unit (FRAU), via connections 28a and 28b, respectively. User devices 24a and 24b are typically customer premises equipment, such as routers or the like, which may be connected to a local area network (LAN) or the like and residing off the NSP network 30. One skilled in the art will realize that the communication devices and user devices may be of any of a wide variety of devices commonly employed in the industry.

For simplicity and as an example, only two communication devices 26a and 26b, are depicted in FIG. 1. In practice, a communication environment 22 will contain many communication devices. Communication devices 26a and 26b are considered communication endpoints and communicate with each other over an NSP network 30, in a conventional manner. NSP network 30 can be, for example, any network that provides connectivity for communication devices 26a and 26b, and in the illustrative example of FIG. 1, is a frame relay communication network. NSP network 30 illustratively connects to communication devices 26a and 26b over connections 32a and 32b, respectively. Connections 32a and 32b can be physical links and can be, for example but not limited to, T1/E1 service or any digital data service (DDS).

NSP network 30 is typically characterized by a mesh network of links (not shown) interconnecting a matrix of intermediate nodes (not shown) through network switches, such as switches 34 and 36, which is well known in the art. For simplicity and as an example, only two network switches 34 and 36 are illustrated herein; however, NSP network 30 will typically contain many network switching devices. Link 38 connects network switch 34 with network switch 36.

Communication devices 26a and 26b are illustratively shown to have an input port 40a and 40b, respectively, which provides for the point of connection with user devices 24a and 24b, respectively, over their respective connections 28a and 28b. Communication devices 26a and 26b have output ports 42a and 42b, respectively, which provide for connectivity to NSP network 30 via their respective connections 32a and 32b. Similarly, network switches 34 and 36, utilize ports to provide connections to the various communication devices and other network switches to which they connect (not shown). In the illustrative example of FIG. 1, port 44a of network switch 34 provides the connection point to connection 32a, thereby providing connectivity to communication device 26a. Likewise, port 44b of network switch 36 provides the connection point to connection 32b, thereby providing connectivity to communication device 26b. Port 46a of network switch 34 provides the connection to link 38 and port 46b of network switch 36 provides the connection to link 38, thereby connecting network switches 34 and 36. For simplicity, network switch 34 is shown as having only two ports, 44a and 46a. As is well known in the art, network switches are typically multi-port devices having a plurality of ports (not shown) which provide connections to a plurality of communication devices (not shown) residing outside of NSP network 30, and a plurality of ports providing connection points to a plurality of links (not shown) which are connected similarly to a plurality of other network switches (not shown) residing within NSP network 30.

The rated capacity of communication device 26a is based upon the maximum amount of data transmission that the communication device 26a can accommodate without errors. Rated capacity, as defined hereinafter, is the maximum amount of data in bits which can be transmitted in the transmit (Tx) direction or the receive (Rx) direction during a specified period of time. The rated capacity of communication device 26a is typically referred to as rated port speed, and usually defined in terms of kilo-bits of data transferred over a one second period (kbps) in the Tx or the Rx direction. Here, after this illustrative example, the Tx direction is defined as communications from user device 24a out through communication 26a to NSP network 30. The Rx direction is defined as communications from NSP network 30 in through communication device 26a to user device 24a. A port having both simultaneous TX capability, known as the transmit side of the port, and Rx capability, known as the receive side of the port, is commonly referred to as a full duplex port. Likewise, each port of a network switch or other devices residing in NSP network 30 may have similarly defined port speeds. A network switch may have a plurality of ports residing in the network switch with each port having a unique port speed.

The actual data transmission rate for any given time period of user device 24a is the aggregation of the actual data transmitted in one direction (either the Tx or Rx direction), by all the individual transmission users connected through user device 24a. Many PC users would typically be connected onto a LAN 48 which is connected to user device 24a. For example, user A and user B may be transmitting into the NSP network 30 (Tx direction) while user X and user Y may be, at approximately the same time, receiving data from the NSP network 30 (Rx direction). Communication device 26a should have sufficient capacity to accommodate this bidirectional data traffic. That is, communication device 26a should have sufficient Tx capacity to accommodate the transmissions of user A and user B. Likewise, communication device 26a should have sufficient Rx capacity to accommodate the receiving of data by user X and user Y.

Some of the above described communication environments may be used to transmit "bursty" data traffic. A burst can be characterized as a continuous stream of bits transmitted through the port. A burst, which may contain one or more frames of a digital data, correlates to the speed of the data transmission through the port. In packet switching environments, bursts may have the data in a single frame or a burst may have the data in multiple strings of frames which are continuously stacked together such that there are no gaps in data transmission between one frame and the succeeding frame, as is well known in the art. Thus, a burst can be specified in terms of speed, such as bits per second, kilo-bits per second (kbps), mega-bits per second (Mb/s), or the like.

Burstiness in this context can best be described as Tx or Rx data communication traffic that is sporadic in nature, with bursts of traffic occurring at frequent, but irregular, time intervals. As the users connected to LAN 48 transmit to NSP 30, the user device 24a assembles the transmitted data into a stream of outgoing data (Tx direction) which is then transmitted to NSP 30 through communication device 26a. Similarly, the user device 24a receives a stream of incoming data (Rx direction) from the NSP network 30, through communication device 26a, destined for the users connected to LAN 48. The random, aggregation of data transmitted or received by the users gives rise to the "bursty" nature of the data traffic.

Optimal operation of the communication environment 22, in theory, would have sufficient rated transmission capacity for each and every port in the network, as measured by rated port speed, to accommodate the total data transmission requirements of each device to which it is connected. As long as the actual data transmission rate through a port is less than the rated port speed, the communication device will have adequate transmission capacity to successfully transmit all of the data. However, if a communication device attempts to transmit data at a rate in excess of rated port speed, data that is in excess of the rated port speed might be discarded or unnecessarily delayed. Discarding of data or excessive delay in transmission is undesirable.

For example, ports 40a and 42a of communication device 26a should ideally have adequate port speed to accommodate the aggregate transmission of all data from NSP network 30 (Rx direction) that is sent to user device 24a, and the aggregate transmission of all data from user device 24a (Tx direction) that is sent to NSP network 30. Once the data transmission capacity of a port is fully utilized, that is, the port is operating at its rated port speed in either the Tx or Rx directions, further attempts to transmit additional data through the communication device 26a (in excess of the port speed) may result in discarded data or excessively delayed transmission of data. Therefore, the speed of ports 40a and 42a should ideally be at least as great as the actual instantaneous total data transmission rate to avoid discarding of data or avoid delays in data transmission.

Because attempts to transmit data at rates greater than the capacity of the communication device may result in data being discarded or in unacceptable delays in data transmission, proper sizing of the communication devices in a communication environment 22 is a key planning parameter for both service providers and end users. Therefore, it is incumbent upon the network engineer designing a communication network to specify the rated transmission capacity of a communication device, as defined by rated port speed, to be adequate to accommodate anticipated data transmissions with acceptable loss and delay. When a user device 24a and its associated communication device 26a are initially connected to a NSP network 30, the network engineer sizes the port speed of the communication device 26a based upon the anticipated data transmission requirements of all users interconnecting through LAN 48 to the user device 24a. Since communication devices typically are constructed in discreet sizes (discreet port speed ratings), the network engineer would typically select the communication device 26a having a rated speed of ports 40a and 42a of the next discreet size which exceeds the anticipated maximum aggregate data transmission from/to the user device 24a. That is, the network engineer should ideally select a communication device 26a having at least the next increment of rated speed for ports 40a and 42a that is greater that the anticipated port speed requirements. Therefore, there is likely some inherent amount of available transmission capacity, or port speed. This excess port capacity may be used to accommodate some measure of growth in traffic, such as when more users are connected onto the user device, or, to accommodate unanticipated high bursts of data transmissions.

However, as more and more users are connected onto LAN 48 through the user device 24*a*, loading on the associated ports 40*a* and 42*a* will increase and eventually reach the rated port speed. At some point, the communication device 26*a* may be asked to transmit data in excess of the rated speed of ports 40*a* and 42*a*, resulting in discarded or delayed data. If discarded or delayed data reaches unacceptable levels, the network engineer would likely recommend increasing the speed of ports 40*a* and 42*a*.

Alternatively, some users connected to LAN 48 may leave. Loading on the ports 40*a* and 42*a* may decrease over time to such an extent that it may become economically desirable to downsize data transmission capacity by decreasing the speed of ports 40*a* and/or 42*a*.

One problem with current management systems of communications networks having bursty communication is that it may be difficult for a network engineer to determine whether rated port speeds are adequate (either in terms of insufficient port speed or uneconomical excess port speed) on an ongoing basis. To the extent that current communication management system practices address these problems at all, such systems are limited to informing the network engineer, in the simplest possible terms, whether or not port speed may be adequate.

Furthermore, current communication management systems, whether automatic or manual, are incapable of determining and recommending to the network engineer the amount by which the port speed should be increased (or decreased).

Therefore, there is a need in the industry for a system and method that automatically analyzes historical data and proactively recommends specific adjustments to the rated port speeds based on such analysis.

SUMMARY OF THE INVENTION

Using historical data and trending analyses, the port trend analysis system in accordance with the present invention provides a unique method for analyzing the performance of a port residing in a communications device in a bursty communication network and recommending changes to port speed based upon the trending analysis. If the port trend analysis system indicates that port speed is inadequate, or trend analysis indicates that port speed may be inadequate in the future, a recommendation may be made to increase port speed, including the magnitude of increase of the port speed. If the port trend analysis system indicates excess capacity, a decrease in port speed may be recommended. Information relevant to the analysis, as well as the ultimate recommendation, are displayed to the user.

The port trend analysis system provides an improvement to a communication management system, wherein the port trend analysis system calculates and presents to a network administrator or a network engineer various views of the performance of the port and recommendations for port speed increases or decreases. This information enables the network administrator or network engineer to determine whether port speed is adequate, or whether the traffic characteristics through the port can be expected to degrade the level of performance of the network such that an increase in port speed is required. A graphical user interface and a display system may display a port trend analysis report. A port trend analysis report may include a graphical view of data traffic through the port in terms of the size of bursts, which may be categorized into burst ranges, may include the number of bits transmitted in each burst range, and may include a trend in the changes of data transmissions for each burst range. Also, the port trend analysis system may recommend a specific change in port speed based upon the calculated trends.

The port trend analysis system provides a system for automatically assessing the data transmission performance of a port residing in a communication device in a bursty network. This system includes a means for collecting burst statistics from a port, a means for storing the burst statistics, a means for specifying a report period of interest, a means for specifying a plurality of summary periods where each summary period corresponds to a portion of the reporting period, and a means for retrieving the burst statistics from storage. When the retrieving means retrieves the burst statistics, only those burst statistics corresponding to a summary period of interest are retrieved. The port trend analysis system then employs a classification means wherein the burst statistics are classified according to a predefined burst range, each burst range corresponding to a predetermined percentage range of rated port speed. As each burst statistic is classified into a burst range, the classification means accumulates the total number of bits transmitted during the burst into a bit total for each burst range for each summary period. The port trend analysis system may further comprise means for presenting the burst statistics and trends in a port trend analysis report and a means for displaying the port trend analysis report.

In addition, the port trend analysis system includes a means for recommending a specific change in port speed based upon the trend analysis. That is, if the burst statistics and trend analysis indicate that the rate of data transmission is increasing across the summary periods, then the port trend analysis system will recommend an increase in port speed by a predetermined amount. Likewise, if burst statistics and trend analysis indicate a decrease in data transmission, the port trend analysis system may recommend a decrease in port speed.

The present invention can also be conceptualized as providing a method for analyzing burst statistics to determine and predict performance of a port residing in a communication device. In accordance with one embodiment of the port trend analysis system, the method may comprise the steps of: collecting burst statistics from a port, storing the burst statistics, specifying a report period of interest, specifying a plurality of summary periods where each summary period corresponds to a portion of the reporting period, retrieving selected burst statistics from storage where the selected burst statistics correspond to a summary period, processing the selected burst statistics into performance parameters which correspond to the actual performance of the port during each of the summary periods, categorizing the performance periods into burst ranges representative of the speed of data transmissions through the port, trending the performance parameters to predict future performance of the port, and recommending a port speed based upon the analysis of the trends. Optionally, the method may further comprise displaying the results of the trend analysis.

Other systems, methods, features, and advantages of the port trend analysis system will be or become apparent to one with skill in the art upon examination of the following drawings and detailed description. It is intended that all such additional systems, methods, features and advantages be included with this description, be within the scope of the port trend analysis system, as defined in the accompanying claims and be protected by the accompanying claims.

BRIEF DESCRIPTION OF THE DRAWINGS

The port trend analysis system, as defined in the claims, can be better understood with reference to the following drawings. The components within the drawings are not necessarily to scale relative to each other, emphasis instead being placed on clearly illustrating the principles of the port trend analysis system.

DETAILED DESCRIPTION OF THE INVENTION

The port trend analysis report system in accordance with the present invention can be implemented in software, hardware, or a combination thereof. In a preferred embodiment, the port trend analysis report system is implemented in software that is stored in a memory and that is executed by a suitable microprocessor (uP) situated in a personal computer (PC) or workstation that is part of a communication network management system. However, the program implementing the port trend analysis report system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 2:
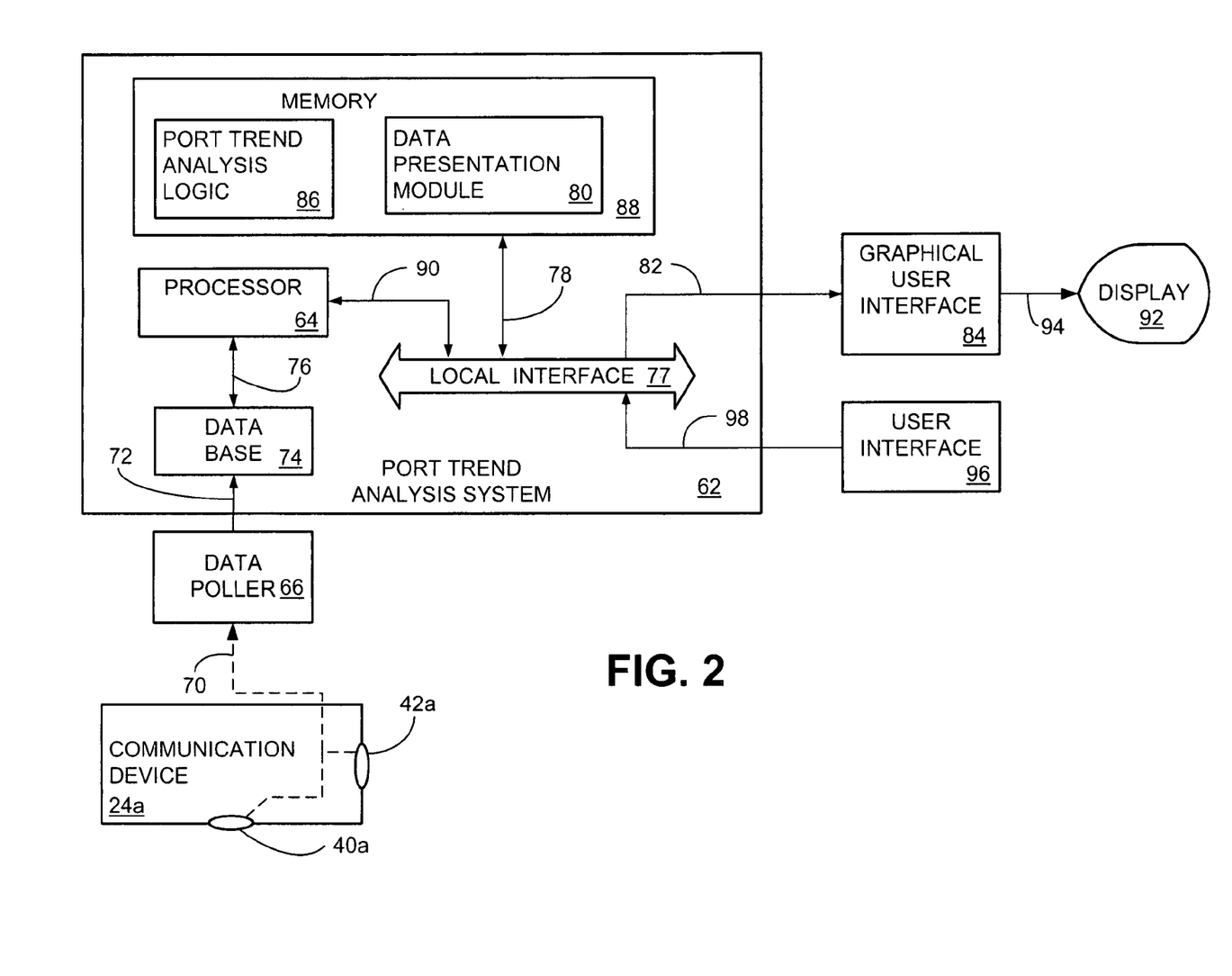
FIG. 2 is a block diagram illustrating a port trend analysis system employing the port trend analysis report logic of the present invention.

FIG. 2 shows a block diagram illustrating a preferred embodiment of the port trend analysis system, which is generally denoted by reference numeral 62. Port trend analysis system 62 contains a number of elements that allow for the performance analysis and management of a communication device 24a (FIG. 1) that is operating in communication environment 22 (FIG. 1). In accordance with a preferred embodiment of the present invention, port trend analysis system 62 includes database 74, processor 64, local interface 77 and memory 88. In the preferred embodiment of port trend analysis system 62, port trend analysis logic 86 and data presentation module 80 reside in memory 88. Memory 88 is in communication with processor 64 over local interface 77 via lines 78 and 90. Port trend analysis system 62 may reside in any convenient location in a network management system (not shown), or may reside in or adjacent to communication device 26a (FIG. 1), or may reside at a location selected by the user. In an alternative embodiment, port trend analysis system 62 may be implemented as software residing in a multi-function processor, such as but not limited to, a PC or a workstation. Such an alternative embodiment of port trend analysis system 62 would interface with other commonly known data presentation methods and/or apparatus without departing substantially from the functionality of a port trend analysis system.

Another alternative embodiment of port trend analysis system 62 may not include database 74. Such another alternative embodiment would retrieve burst statistic information from other commonly known data accumulation systems without departing substantially from the functionality of a port trend analysis system.

Processor 64 executes the port trend analysis logic 86 and the data presentation module 80 in a manner described hereinafter. In an alternative embodiment, memory 88 may reside outside of the port trend analysis system 62 in a convenient location. Another alternative embodiment of the port trend analysis system 62 may provide for database 74 to reside in memory 88 concurrently with the port trend analysis logic 86 and the data presentation module 80, or in another commonly shared memory unit (not shown) residing outside of the port trend analysis system 62.

Any of the above mentioned alternative embodiments of a port trend analysis system are intended to be within the scope of this disclosure and the claims of the port trend analysis system.

Data poller 66 receives information, hereinafter known as burst statistics, for at least one port, such as port 40a and/or port 42a (see also FIG. 1). Data poller 66, in an alternative embodiment, may receive burst statistic information from ports residing in other communication devices (not shown). A burst can be categorized relative to the port speed, such as by a plurality of burst ranges where each burst range corresponds to a percentage range of the port speed. In the preferred embodiment, the port trend analysis system 62 analyzes five burst ranges (0%–20%, 21%–40%, 41%–60%, 61%–80% and 81%–100% 0 f port speed). If the number of bits in the burst is added to all others for the given range during a predefined period, and the same is done for all ranges, the full set of burst ranges (five burst ranges in the preferred embodiment) can be said to represent a statistical picture of the port burstiness for the predefined period. In the preferred embodiment, the port trend analysis system 62 analyzes burst statistics with a predefined period of fifteen minutes, however any statistically relevant period and/or any number of burst ranges may be employed in alternative embodiments.

Communication path 70 provides for communications between ports 40*a* or 42*a* and data poller 66 by any means or apparatus commonly employed in the communication arts, such as but not limited to, the facilities of the NSP network 30 (FIG. 1), standard telephony systems, microwave communication systems, radio frequency (RF) systems, satellite communication systems, or the like. Although ports 40*a* and 42*a* are shown as remotely connecting to port trend analysis system 62 through communication path 70, an alternative embodiment may connect the port trend analysis system 62 directly to communication device 24*a*.

Data poller 66 receives burst statistics from only one port at a time. Thus, data poller 66 would be monitoring port 40*a*, or data poller 66 would be monitoring port 42*a*. Alternative embodiments of the data poller 66 may provide for the monitoring of a plurality of ports residing in a single communication device, such as communication device 24*a*, and provide to an alternative embodiment of the port trend analysis system a plurality of burst statistics corresponding to the above mentioned plurality of ports.

Another alternative embodiment of the data poller 66 could provide communication paths to a plurality of communication devices for the monitoring of a plurality of ports residing in the plurality of communication devices. Here, a plurality of burst statistics corresponding to the above mentioned plurality of ports and plurality of communications devices would by provided to an alternative embodiment of the port trend analysis system.

One skilled in the art will also realize that the apparatus and method of the port trend analysis system 62 will perform equally well when analyzing burst statistics from a port of any type of communication device employed within NSP network 30 (FIG. 1). For these alternative embodiments of a port trend analysis system, a port is defined to be the location or element in the communication device in which data traffic flow is monitored, regardless of the commonly applied name given to that location or element. For example, a port trend analysis system 62 could analyze the performance of port 44*a* or port 46*a* of the network switch 34 of FIG. 1. Any such applications of the port trend analysis system 62 are intended to be within the scope of this disclosure and the claims of the port trend analysis system.

Data poller 66 collects burst statistics, such as the number of bits transmitted within each burst range of data, for the port being monitored. An apparatus and method for accumulating burst statistics is disclosed in commonly assigned co-pending U.S. patent application Ser. No. 09/118,106, entitled "SYSTEM AND METHOD FOR CHARACTERIZING BURST INFORMATION," filed on Jul. 17, 1998, and which is hereby incorporated by reference in its entirety. Data poller 66 supplies burst statistics information over connection 72 to database 74. In the preferred embodiment, burst statistics are associated with the direction of travel of the data burst (Tx or Rx). The historical burst statistics data residing in database 74 may be collected over any period of time that is pertinent to the user, such as, for example, a number of weeks or months. Such a pertinent time period residing in database 74 is referred to herein as the historical period. In some cases, adequate burst statistics may be obtained in as few as four complete summary periods (described hereinafter). However, the accuracy of the analysis typically improves as additional burst statistics data are obtained and saved in the historical period. Since the usage of a particular port may vary seasonally or otherwise cyclically over long periods of time, the particular historical periods may be specified in one embodiment of the port trend analysis system 62 by the user, thereby increasing the relevance of the data residing in the historical period. Periods of little interest (such as, for example, periods outside normal business hours) may be excluded from a historical period in order to optimize data storage in database 74. One skilled in the art will realize that the amount of data that can be stored in the historical period will be determined by the size of the storage capability of database 74. Methods of storing data, methods of recycling out old data from the historical period and methods of cycling in of new data into the historical period may be accomplished in any variety of techniques commonly employed in the art of data management without adversely impacting the functionality of the port trend analysis system 62. Also, historical data for multiple ports may be saved to database 74. This additional data enables alternative embodiments of the processor 64 to prepare port trending reports for a plurality of ports using only one database 74.

Processor 64 executes the port trend analysis logic 86 to retrieve the historical burst statistics data from database 74. Processor 64 then executes port trend analysis logic 86 to analyze the historical burst statistics data, and the results of this analysis being used to generate the port trend analysis report as discussed in detail hereinafter.

Processor 64 prepares the port trend analysis report by executing the data presentation module 80, which formats the analyzed data for presentation. One skilled in the art will realize that data presentation module 80 may format the data for presentation in any suitable format commonly employed in the art such as, but not limited to, graphical reports, tabular reports, or a combination of graphical and tabular reports. Any such report prepared by processor 64 may be displayed on any suitable device, such as but not limited to, a CRT, a line printer, an X-Y plotter or a flat panel display screen.

In the preferred embodiment, processor 64 forwards the formatted report over connection 82 to graphical user interface (GUI) 84. GUI 84 prepares the data for viewing by a network administrator or network engineer on display 92 via connection 94.

Figure 5:
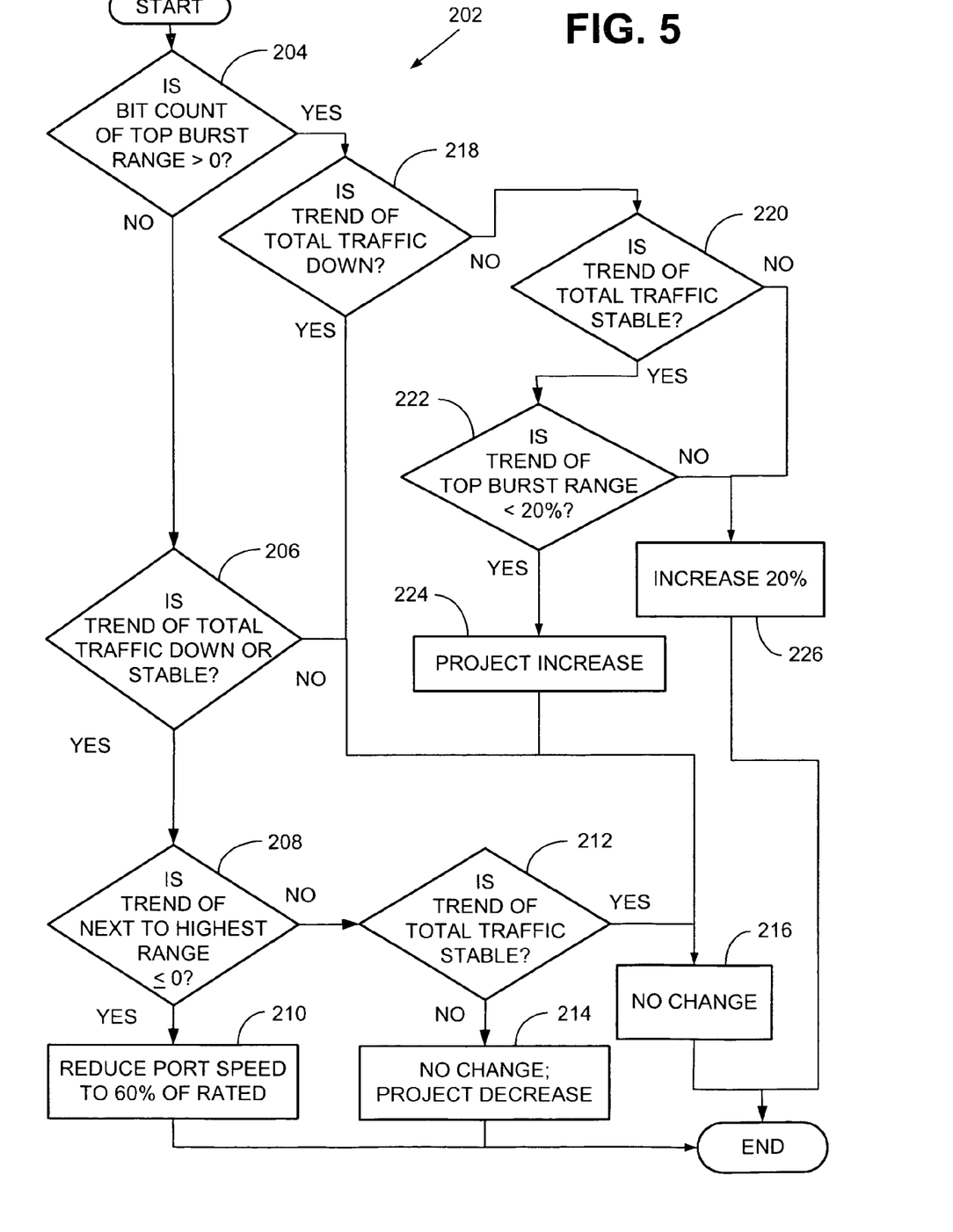
FIG. 5 is a flow diagram illustrating in greater detail the recommended port size logic of the port trend analysis system of FIGS. 2 and 3.

Port trend analysis system 62 provides for the analysis and display of port performance for various time periods of interest. The time period of interest is defined by the reporting period and the summary periods, as defined hereinafter. For example, a network engineer may be operating a user interface 96, such as a keyboard or the like, and request a port trend analysis report, via connection 98, for a specified port over a specified reporting period. The port trend analysis system 62 automatically provides the network engineer with a report (a sample of which is illustrated in FIG. 5) and a determination of whether the port is performing as desired. If port performance is below the user's acceptable level of performance, an alternative embodiment of the port trend analysis system 62 predicts when port capacity may become over-utilized and recommends a new performance rating, such as but not limited to a specific adjustment to port speed, so that the desired port performance can be known.

For an illustrative example, port trend analysis system 62 may be analyzing the performance of port 42*a* residing in communication device 24*a*. Data pertaining to the amount of data transmitted through port 42*a* and the rate at which the data is transmitted through the port 42*a* may indicate that port utilization is approaching the rated port speed of port 42*a*. In this situation, port trend analysis system 62 would indicate to the network engineer that actual port utilization was, at times, approaching rated port speed, trend the port utilization to predict when the port capacity may become over-utilized, and recommend a change in performance rating, such as, but not limited to, a specific increase of the rated port speed of port 42a.

Similarly, historical data collected by the port trend analysis system 62, may indicate that actual port utilization is significantly below the rated port speed of port 42a. In this under utilization scenario, port trend analysis system 62 would recommend to the network engineer a change in performance rating corresponding to the amount by which the rated port speed of port 42a could be reliably decreased.

Figure 3:
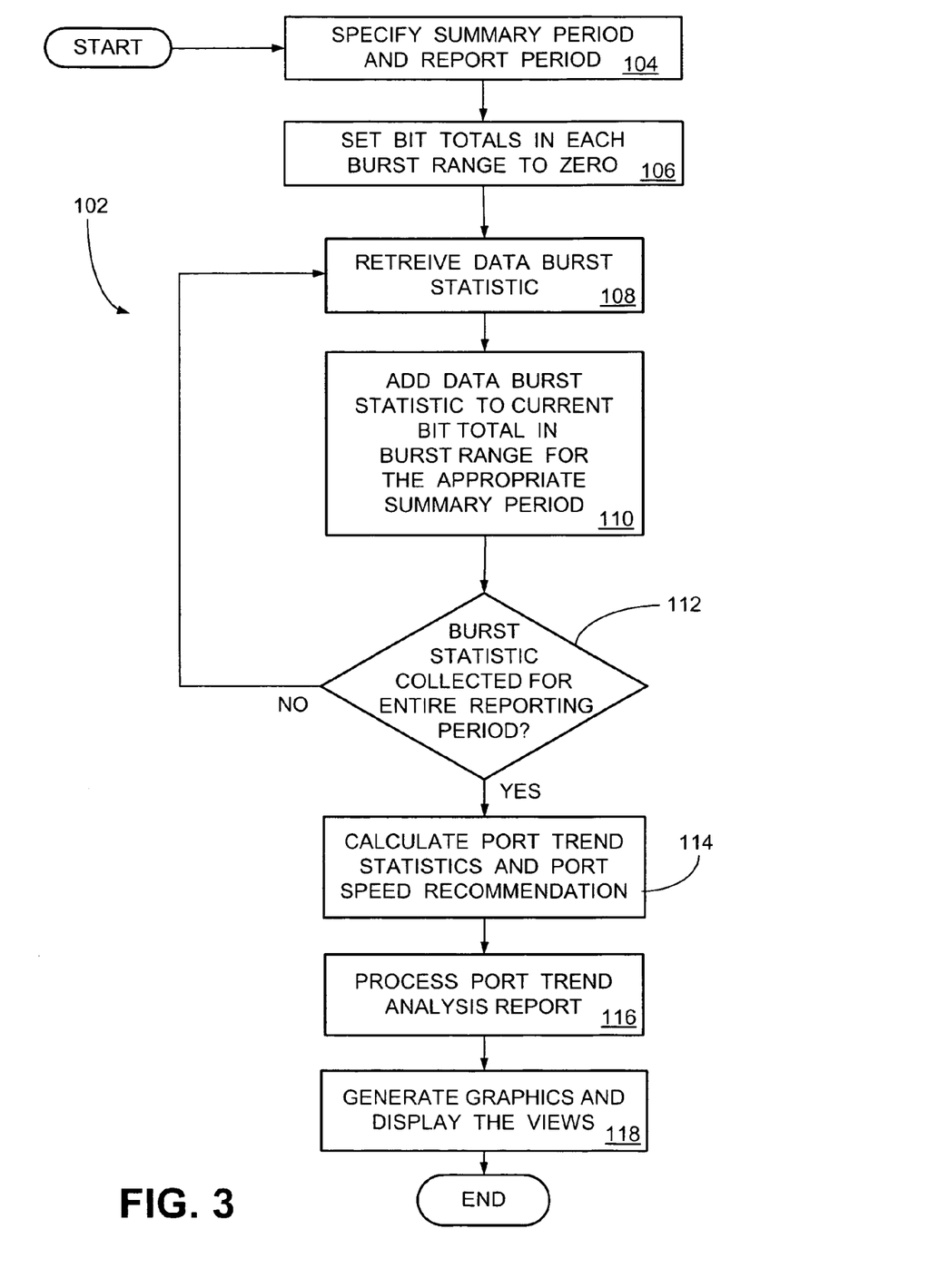
FIG. 3 is a high level flow diagram illustrating the operation of the port trend analysis system of FIG. 2.

FIG. 3 is a high level flow chart 102 illustrating the operation of the preferred embodiment of a processor 64 of FIG. 2 as applied to generating a typical port trend analysis report 132 shown in FIG. 5. Flow chart 102 shows the architecture, functionality, and operation of a possible implementation of the software for implementing the port trend analysis system 62 (FIG. 2). In this regard, each block may represent a module, segment, or portion of code, which comprises one or more executable instructions for implementing the specified logical function(s). It should also be noted that in some alternative implementations, the functions noted in the blocks may occur out of the order noted in FIG. 3 or include additional functions without departing substantially from the overall functionality to be achieved. For example, two blocks shown in succession in FIG. 3 may in fact be executed substantially concurrently, the blocks may sometimes be executed in the reverse order, or some of the blocks may not be executed in all instances, depending upon the functionality involved, as will be further clarified hereinbelow.

In block 104, the user, such as a network administrator or a network engineer, specifies a plurality of summary periods and a report period for the port for which data traffic will be analyzed. In the preferred embodiment, a summary period includes the days and the times of the day that are of interest. For example, as will be described in greater detail in FIG. 4 hereinafter, a summary period may be defined as the days of Monday through Friday, and the hours between 8:00 a.m. and 5:00 p.m. The report period encompasses the plurality of summary periods. Each summary period must encompass the same corresponding period of time consequently within the reporting period. For example, and as will be explained in greater detail with FIG. 4 hereinafter, a reporting period could include five summary periods (Monday through Friday, 8:00 a.m. to 5:00 p.m.) and a specification of the starting date of each summary period (five consecutive Mondays).

One skilled in the art will appreciate that the above example of a summary period and a reporting period are merely intended as illustrated examples. One alternative embodiment of processor 64 would provide user capability to specify a summary period and a reporting period tailored to the particular needs of the user. Another alternative embodiment would require the user to specify the port of interest when database 74 (FIG. 2) contains historical data for multiple ports.

Figure 4:
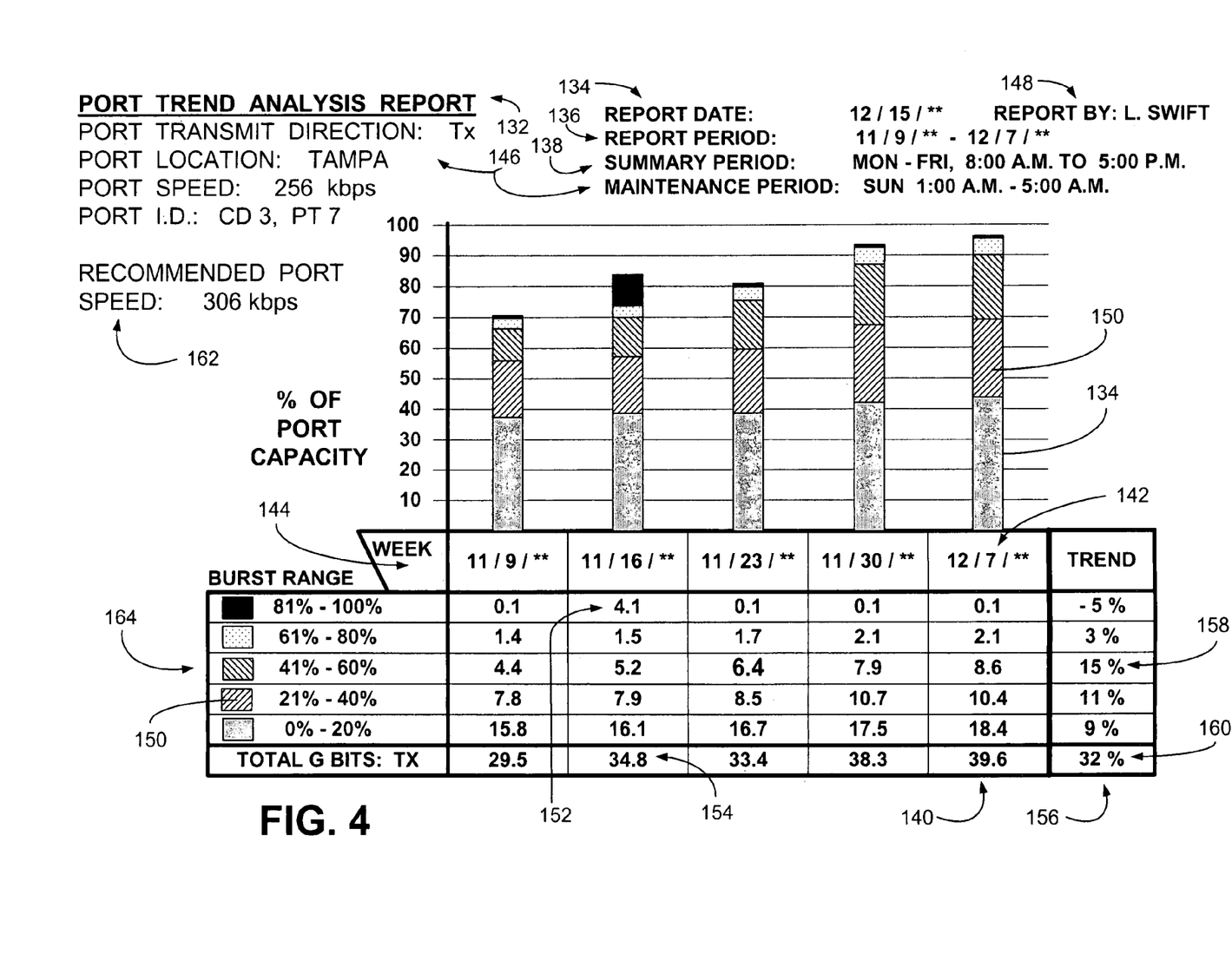
FIG. 4 is a graphical and tabular representation of a port trend analysis report generated by the port trend analysis system of FIGS. 2, 3 and 5.

In block 106, bit totals in each burst range are set to zero. A burst range is defined hereinafter as some pre-determined percentage of the rated port capacity or rated port speed. In the preferred embodiment, and as illustrated in FIG. 4, five burst ranges are defined. These burst ranges are 0%–20%, 21%–40%, 41%–60%, 61%–80% and 81%–100%. In alternative embodiments, the user may specify a plurality of burst ranges and/or the magnitude of each burst range.

In block 108, burst statistics for each predefined period are retrieved from database 74 (FIG. 2). Then, at block 110, the number of bits in each burst range and predefined period is added to the current bit total of its respective burst range for the summary period.

At block 112, a test is made to determine if all of the burst statistics for the specified reporting and summary periods have been retrieved from database 74 (FIG. 2). If additional burst statistics are to be collected from database 74, the NO condition, the process returns to block 108 and another data burst statistic is retrieved from database 74. If all of the burst statistics have been collected for the specified reporting period, the YES condition, the process continues to block 114.

In block 114, accumulated burst statistics for each burst range and summary period are analyzed by processor 64 (FIG. 2) to determine the port trend statistics as described hereinafter. After port trend statistics have been calculated, the process continues to block 116 where a port trend analysis report is processed. Then, at block 118, a graphics of the port trend analysis report is generated and the report is displayed to the user. The process then ends.

FIG. 4 shows an illustrative example of a computer display screen on display 92 (FIG. 2) and represents the preferred embodiment of a port trend analysis report 132 generated by the processor 64 (FIG. 2), prepared by the data presentation module 80 and displayed by graphical user interface 84. This illustrative port trend analysis report 132 could be displayed to a network administrator or a network engineer on display 92 or any other suitable device. The port trend analysis report 132 shown in FIG. 4 consists of a bar chart and a data table as shown. For illustrative purposes, a report preparation date (reference number 134) of December 15 in the year of interest (12/15/) is shown and represents the date at which the port trend analysis report was prepared. The report period 136 is shown to be from November 9 through December 12. The summary period 138 has been selected to be, in this illustrative example, Monday through Friday between the hours of 8:00 a.m. to 5:00 p.m. Burst statistics for the summary period are shown by a bar 134 on the bar chart, and in a column 140 of the data table. For example, the farthest right side bar 134 of the bar chart is shown to begin on Monday, December 7 as shown by date 142. The summary period ends five days later on Friday, December 12, which coincides with the end of the report period described above. Therefore, with the report period and summary periods as defined in this illustrative example, the port trend analysis report 132 is seen to have five summary periods beginning on the dates shown below each corresponding bar on the bar chart, as denoted in the table row showing the weeks 144**. Alternative embodiments of the port trend analysis system may allow the user to specify the number of summary periods in the report period, or allow the user to specify multiple reporting periods.

The port trend analysis report 132 may also provide other miscellaneous information 146 of interest to the user. In the preferred embodiment shown in FIG. 4, this information includes the direction of port transmission, here in the Tx direction; the port location Tampa; the port speed of 256 kbps; the port ID (card 3, port 7); and a maintenance period. Also, the name of the user who is preparing the report, L. Swift, is shown 148. This miscellaneous information may be included on the report without departing substantially from the functionality of the present invention.

As previously described, this illustrative example of a port trend analysis report 132, provides for five burst ranges. These burst ranges are 0%–20%, 21%–40%, 41%–60%, 61%–80%, 81%–100%. Additionally, each burst range corresponds to a particular portion of a bar 134 on the bar chart. For example, the burst range category 21%–40%, is shown as a white portion having forward slash marks 150. Alternative embodiments of the port trend analysis system provide for specifying any number of burst ranges. In practice, each of the burst ranges shown on port trend analysis report 132 may be plotted with a unique color and/or a unique coding symbol to clearly identify the bar portion being plotted on bar 134.

Looking now to the table shown on the port trend analysis report 132, a number is shown in each cell of the table which corresponds to the number of bits in the final bit total of each burst range for each summary period. Each bit total is determined in block 112 of FIG. 3. For example, in the burst range 152 of 81%–100% for the week of November 16, 4.1 giga-bits were recorded as going into the bit total for the report period starting on Monday, November 16, at 8:00 a.m. and ending on Friday, November 20, at 5:00 p.m.

The last number in each of the columns is a total count of giga-bits collected over the summary period for all burst ranges. For example, for the summary period beginning on Monday, November 16, the total giga-bits 154 counted during that summary period was 34.8 giga-bits. This total of 34.8 giga-bits is equal to the sum of the giga-bits counted for each of the individual burst ranges (4.1+1.5+5.2+7.9+16.1=34.8).

In summary, one portion of the port trend analysis report 132 table indicates the number of bits counted in each burst range for each summary period, and the total number of giga-bits counted in each summary period. Alternative embodiments of the port trend analysis system may provide for indicating the number of bytes transmitted or some like comparable unit representative of data transmission rates.

The port trend analysis report 132 shown in FIG. 4 is for a port transmit direction, Tx. In the preferred embodiment, the user may also specify preparation of a port trend analysis report 132 for the same port in the Rx direction. Another alternative embodiment could perform an analysis for both the TX and Rx directions, could display the report for the direction specified by the user, or select and display the report for the direction having the more significant usage.

Trending information for each burst range and trending information for the total giga-bits transmitted (or received) is shown in the far right hand column 156 of the data table of the port trend analysis report 132. The method of determining trend values and the application of the trend value information to determine a recommended port speed will be described hereinafter. For the illustrative example of a port trend analysis report 132 of FIG. 4, a trend of 15% is shown for burst range 41%–60% (reference numeral 158). This trend value of 15% indicates that the trend of the bits counted in the 41%–60% burst range for the five summary periods is increasing at a rate of 15%. The total trend rate of 32% (reference numeral 160) indicates that the total giga-bits for each of the summary periods is increasing at a rate of 32%. One skilled in the art will appreciate that the trending information provided by the port trend analysis report will indicate to a network administrator or a network engineer whether or not a particular communication device port has adequate port speed, or port capacity, and whether or not a change in port speed should be planned for. For example, the recommended port speed 182 shown in the illustrative port trend analysis report 132 of FIG. 4 is 306 kbps. Because the recommended port speed of 306 kbps exceeds the current port speed of 256 kbps, the network administrator or network engineer would realize that the present port speed of 256 kbps will likely not be adequate in the future. Thus, the network administrator or network engineer could anticipate the need to upgrade port speed and based upon the recommended port speed of 306 kbps, recommend an appropriate upgrade to the port (i.e., next higher available increment of port speed).

Once all of the burst statistics have been retrieved from database 74 (FIG. 2) for the entire report period, as shown in blocks 108 through 114 of the flow chart 102 (FIG. 3), trending for bit totals in each of the burst ranges and each of the summary periods can be determined. Trending is determined by applying a statistical linear regression method to the bit totals for each burst range across the summary periods. For example, the trend of 15% for the 41%–60% burst range (FIG. 4) is the result of a linear regression analysis of the following points: 4.4, 5.2, 6.4, 7.9 and 8.6, which correspond to the bit totals shown in the 41%–60% burst range row 164. Alternative embodiments of the port trend analysis system employ different statistical regression analysis methods. Application of any such statistical analysis methods is intended to be within the scope of this disclosure and be protected by the claims for the port trend analysis system.

An alternative embodiment of the port trend analysis system would, in the event that port speed was inadequate or that the trending analysis indicated that port speed would become inadequate in the future, predict the time at which port speed would become inadequate and display the predicted time on the port trend analysis report. This alternative embodiment would use commonly known statistical methods to project trending information so that the predicted time could be determined. Similarly, another alternative embodiment of the port trend analysis system could predict the time at which a recommended decrease in port speed would be desirable. Any such alternative embodiments are intended to be within the scope of this disclosure and be protected by the claims for the port trend analysis system.

FIG. 5 is a flow chart 202 illustrating the architecture, functionality, and operation of a preferred embodiment for software for implementing the determination of a recommended port speed. In this regard, each block may represent a module, segment or portion of code, which comprises one or more executable instructions for implementing the specified logical function(s). It should also be noted that in some alternative implementations, the functions noted in the blocks may occur out of the order noted in FIG. 5, or may include additional functions without departing substantially from the overall functionality to be achieved. For example, two blocks shown in succession in FIG. 5 may, in fact, be executed substantially. Concurrently, the blocks may sometimes be executed in reverse order, or some of the blocks may not be executed in all instances, depending on the functionality involved, as will be further clarified hereinbelow.

The process of determining a recommended port speed begins at block 204 where the bit count of the 81%–100% burst range, hereinafter referred to as the top burst range, is analyzed. If the bit count in the top burst range is greater than zero for any of the summary periods of the port trend analysis report 132 (FIG. 4) the process proceeds to step 218, as described hereinafter. If the bit counts in each of the top burst ranges are zero, then the process proceeds to block 206.

At block 206, the trend of the total traffic (see also reference numeral 160 at FIG. 4) is examined to determine if the trend is down or stable. Stable is defined hereinafter to be any trend value between the range of ±10%. A trend is defined hereinafter as down if the trend value is less than −10%, and a trend is defined hereinafter as increasing if the trend value is greater than 10%. In block 206, if the trend is down or stable (10% or less), the process proceeds to block 208.

At block 208, a determination is made whether the next to highest burst range is less than or equal to zero. In the illustrative example shown in FIG. 4, block 208 would analyze the 61%–80% burst range. If the YES condition is satisfied, the process proceeds to block 210 where a recommendation is made to reduce port speed to 60%. The process then ends.

However, at block 208, if the trend of the next highest burst range is greater than zero, the NO condition, then the process proceeds to block 212. At block 212, a determination is made whether the trend of total traffic is stable. If the NO condition is satisfied then the process continues to block 214 where no change to port speed is recommended. However, a future decrease in port speed is projected, and thus notifies the network administrator or network engineer to evaluate the port on an on-going basis so that the timing of a reduction in port speed can be identified. The process then ends.

If at block 212 a determination is made that the total traffic is stable, the YES condition, then the process proceeds to block 216 where no change to port speed is recommended. The process then ends.

Summarizing the process as described thus far, if there are no bits counted in the top burst range and if the trend of the total traffic is down or stable, the port trend analysis system will recommend that the port speed be decreased to 60% if the trend of the next highest range is less than zero. The port trend analysis system will recommend no change (but project a future decrease in port speed) if the trend of the next highest range is greater than zero and total traffic is decreasing. The port trend analysis system will recommend no change to the port speed if the trend of the next highest range is greater than zero and the trend of total traffic is stable.

Returning now to block 206, if the trend of total traffic is upwards (equivalent to not down or not stable), the NO condition is satisfied and the process proceeds to block 216 where no change in port speed is recommended. The process then ends.

Returning now to block 204, if any of the bit counts in the top burst range are greater than zero, the process proceeds to block 218. At block 218, a determination is made whether the trend of the total traffic is down. If so, the YES condition, the process proceeds directly to block 216 which indicates that no change is recommended to the port speed. The process of recommending port speed then ends. Summarizing, the network administrator or the network engineer will realize that even though there are occasional bursts of data within the 81%–100% burst range, the overall trend in data transmission is down and that no upgrade in port speed may be required at the time of the port trend analysis report date. Also, the network administrator and network engineer will realize that the downward trend in total traffic transmission may not be sufficient so as to warrant a decrease in port speed. Therefore, the network administrator or network engineer would realize that no changes are warranted.

However, if the trend of the total traffic is not down, as tested at block 218, the process continues to block 220. That is, the process continues to block 220 if the trend of total traffic is either stable (±10%) or increasing (greater than 10%).

At block 220, a determination is made whether the trend of the total traffic transmitted is stable. If so, the YES condition, the process proceeds to block 222. At block 222, a determination is made in this embodiment whether the trend of the top burst range is less than 20%. If so, the YES condition, the process proceeds to block 224. At block 224, the port trend analysis report 132 (FIG. 4) indicates to the network administrator or network engineer that an increase in port utilization is projected. The process then continues to block 216 where no change to the port speed is recommended. The process then ends. Summarizing, the network administrator or network engineer may then realize that this port should be monitored on an on-going basis.

If at block 220 the trend of the total traffic is not stable, the NO condition, the process proceeds to block 226. At block 226, the recommended increase to the rated port speed, in this embodiment, will be 20%. The process then ends. Summarizing, the network administrator or the network engineer may realize that the bit count of the top burst range is increasing (greater than 10%), that the trend in total traffic transmitted is increasing (greater than 10%), and that the port speed might be increased by at least 20%.

Returning now to block 222, if the NO condition is satisfied, that is the trend of the top burst range is greater than or equal to 20%, the process proceeds to block 226 and a recommendation is made to increase the rate of the port speed by 20%. The process then ends. Summarizing, the network administrator or the network engineer may realize that the bit count of the top burst range is increasing at a rate greater than 20% and that the port speed might be increased.

One skilled in the art will realize that the determination logic illustrated in FIG. 5, and as applied to the illustrative port trend analysis report 132 of FIG. 4, is intended as an illustrative example of the application of the port trend analysis system. The definition of a stable trend being plus or minus 10% is an arbitrary range which may be adjusted in alternative embodiments of a port trend analysis system depending upon the user's needs and the significance of the data. Likewise, the recommended increase of 20% made at block 226 is arbitrary, and the increase amount could be any value in alternative embodiments as determined by the needs of the particular user. Also, the recommendation to reduce port speed to 60% of rated port speed, as specified at block 210 of FIG. 5, could be changed in alternative embodiments to any other percentage reduction in port speed. Any such applications or variations of the port trend analysis system are intended to be within the scope of this disclosure and the claims of the port trend analysis system.

In summary, statistics on the port usage are accumulated over a period of time and stored in a database 74 (FIG. 2). A network administrator or network engineer, or another interested user, would then request the port trend analysis system 62 to prepare a port trend analysis report 132 (FIG. 4) by specifying a report period and a plurality of summary periods covering some part or all of the stored statistics. In the preferred embodiment, as illustrated in FIG. 4, the user would specify five summary periods beginning on a specified starting report period date (report period 11/9/ through −12/12/, five summary periods each beginning on Monday at 8:00 a.m. and running through Friday at 5:00 p.m.). The processor 64 (FIG. 2) would then retrieve the categorized burst data from database 74 (FIG. 2) for the relevant summary periods. The processor 64 would total the number of bits in each of the five burst ranges during each summary period and then, for each of the five burst ranges and five summary periods, determine a trending of the bits transmitted using a linear regression analysis technique.

Then, the processor 64 would make a determination, using the method outlined in the flow chart of FIG. 5, to recommend either a decrease in port speed, no change in port speed, or an increase in port speed. One skilled in the art will realize that the recommended increase, decrease or no change in port speed made by the processor 64, is intended to provide guidance to the network administrator or the network engineer in the design, operation and maintenance of a communication system 22 (FIG. 1). The ultimate decision to increase, decrease or not change port speed would be made by the network administrator or the network engineer based upon the information provided by the port trend analysis system 62 (FIG. 2) and the totality of other factors and circumstances in which the communication system 22 operates.

It should be emphasized that the above-described embodiments of the port trend analysis system, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the port trend analysis system, as defined in the claims that follow.

The invention claimed is:

1. A system for determining and predicting performance and recommending a configuration of a communication device, comprising:
    means for specifying a reporting period, said reporting period corresponding to a reporting period of interest;
    means for specifying a plurality of summary periods, each said summary period defining a different portion of said reporting period, and wherein each said summary period corresponds to a plurality of days of interest and to a portion of said days of interest;
    means for processing a retrieved plurality of selected data parameters into a plurality of per-summary-period performance parameter groups, each group corresponding to actual performance of said communication device during one of said summary periods, each performance parameter in the group corresponding to a performance category within the summary period;
    means for presenting and displaying each of said performance parameter groups in association with the corresponding summary period for the group;
    means for processing the per-summary-period performance parameter groups into a plurality of trend parameters to predict future performance of said communication device;
    means for presenting and displaying in a trend report said plurality of trend parameters for said reporting period; and
    means for recommending a performance rating in terms of capacity or size for said communication device based upon said plurality of trend parameters, wherein said performance rating corresponds to a port speed of a port residing in said communications device, wherein said port speed corresponds to the rate at which data is transmitted through said port.

2. The system of claim 1, wherein at least one of said selected data parameters is a burst statistic.

3. The system of claim 2, further comprising a means for specifying a plurality of burst ranges.

4. The system of claim 2, further comprising a means for specifying a percentage range for each one of said burst ranges.

5. The system of claim 2, wherein said processing means for processing the per-summary-period performance parameter groups into a plurality of trend parameters further comprises a burst range trending means which predicts future performance of said communication device relative to each said burst range.

6. The system of claim 3, wherein at least one of said burst ranges is a total burst range corresponding to the total number of all bits transmitted during each one of said summary periods.

7. The system of claim 1, wherein said processing means for processing the per-summary-period performance parameter groups into a plurality of trend parameters determines said plurality of trend parameters using a statistical regression algorithm.

8. The system of claim 7, wherein said processing means for processing the per-summary-period performance parameter groups into a plurality of trend parameters further processes said plurality of trend parameters to predict the time at which capacity of said communication device becomes over utilized or under utilized and should be changed.

9. A system for determining and predicting performance and recommending a configuration of a communication device, comprising:
    a data poller, wherein said data poller collects a plurality of data parameters from said communication device;
    a database which stores said data parameters;
    a user interface, wherein a user specifies a reporting period, said reporting period corresponding to a reporting period of interest, and said user specifies a plurality of summary periods, each said summary period defining a different portion of said reporting period, and wherein each said summary period corresponds to a plurality of days of interest and to a portion of said days of interest;
    a processor, wherein said processor retrieves a plurality of selected data parameters from said database such that said plurality of selected data parameters corresponds to said plurality of summary periods, and wherein said processor processes said plurality of selected data parameters into a plurality of per-summary-period performance parameter groups which correspond to actual performance of said communication device during one of said summary periods, each performance parameter in the group corresponding to a performance category within the summary period;
    a data presentation module, wherein said module presents each of said plurality of processed performance parameter groups in association with the corresponding summary period;
    wherein the processor trends said plurality of per-summary-period performance parameter groups into a plurality of trend parameters to predict future performance of said communication device, and
    the data presentation module presents in a trend report said plurality of trend parameters associated with said reporting period;
    wherein said processor recommends a performance rating in terms of capacity or size for said communication device based upon said plurality of trend parameters, wherein said performance rating corresponds to a port speed of a port residing in said communications device, wherein said port speed corresponds to the rate at which data is transmitted through said port.

10. The system of claim 9, wherein at least one of said selected data parameters is a burst statistic.

11. The system of claim 10, wherein a user specifies via said user interface a plurality of burst ranges.

12. The system of claim 10, wherein a user specifies via said user interface a percentage range for each one of said burst ranges.

13. The system of claim 10, wherein said processor further trends each said burst range to predict future performance of said communication device relative to each said burst range.

14. The system of claim 11, wherein at least one of said burst ranges is a total burst range corresponding to the total number of all bits transmitted during each one of said summary periods.

15. The system of claim 9, wherein said processor generates said plurality of trend parameters using a statistical regression algorithm.

16. The system of claim 15, wherein said plurality of trend parameters predict the time at which capacity of said communication device becomes over utilized or under utilized and should be changed.

17. A method for determining and predicting performance and recommending a configuration of a communication device, the method comprising the steps of:
   collecting a plurality of data parameters from said communication device;
   specifying a reporting period, said reporting period corresponding to a reporting period of interest;
   specifying a plurality of summary periods, each said summary period defining a different portion of said reporting period, and wherein each said summary period corresponds to a plurality of days of interest and to a portion of said days of interest;
   processing a plurality of selected data parameters into a plurality of per-summary-period performance parameter groups, each group corresponding to actual performance of said communication device during one of said summary periods, each performance parameter in the group corresponding to a performance category within the summary period;
   presenting each of said plurality of performance parameters in association with the corresponding summary period;
   processing said per-summary-period performance parameter groups into a plurality of trend parameters to predict future performance of said communication device;
   presenting in a trend report said plurality of trend parameters associated with said reporting period; and
   recommending a performance rating in terms of capacity or size for said communication device based upon said plurality of trend parameters, wherein said performance rating corresponds to a port speed of a port residing in said communications device, wherein said port speed corresponds to the rate at which data is transmitted through said port.

18. The method of claim 17, wherein at least one of said selected data parameters is a burst statistic.

19. The method of claim 18, further comprising a step of specifying a plurality of burst ranges.

20. The method of claim 18, further comprising a step of specifying a percentage range for each one of said burst ranges.

21. The method of claim 20, wherein said processing said per-summary-period performance parameter groups into a plurality of trend parameters step further comprises a burst range trending step which predicts future performance of said communication device relative to each one of said burst ranges.

22. The method of claim 19, wherein at least one of said burst ranges is a total burst range corresponding to the total number of all bits transmitted during each one of said summary periods.

23. The method of claim 17, wherein said processing said per-summary-period performance parameter groups into a plurality of trend parameters step determines said plurality of trend parameters using a statistical regression algorithm.

24. The method of claim 23, wherein said processing said per-summary-period performance parameter groups into a plurality of trend parameters step further includes the step of predicting the time at which capacity of said communication device should be changed.

25. A computer readable medium having a program for determining and predicting performance and recommending a configuration of a communication device, the program comprising logic configured to perform the steps of:
   receiving a specification of a reporting period from a user, said reporting period corresponding to a reporting period of interest;
   receiving a specification for a plurality of summary periods, each said summary period defining a different portion of said reporting period, and wherein each said summary period corresponds to at least one day of interest and to at least a portion of said day of interest;
   retrieving a plurality of selected data parameters, said plurality of selected data parameters corresponding to said plurality of summary periods;
   processing said plurality of selected data parameters into a plurality of per-summary-period performance parameter groups, each group corresponding to actual performance of said communication device during one of said summary periods each performance parameter in the group corresponding to a performance category within the summary period;
   presenting each of said plurality of performance parameters in association with the corresponding summary period;
   trending said plurality of per-summary-period performance parameter groups into a plurality of trend parameters to predict future performance of said communication device;
   presenting in a trend report said plurality of trend parameters associated with said reporting period; and
   recommending a performance rating in terms of capacity or size for said communication device based upon said plurality of trend parameters, wherein said performance rating corresponds to a port speed of a port residing in said communications device, wherein said port speed corresponds to the rate at which data is transmitted through said port.

26. A method for determining and predicting performance and recommending a configuration of a communication device, the method comprising the steps of:
   retrieving a plurality of selected data parameters from a communication device, such that said plurality of selected data parameters corresponds to a plurality of summary periods, each said summary period defining a different portion of a reporting period, and wherein each said summary period corresponds to at least one day of interest and to at least a portion of said day of interest;

processing said plurality of selected data parameters into a plurality of per-summary-period performance parameter groups, each group corresponding to actual performance of said communication device during one of said summary periods;

trending said plurality of per-summary-period performance parameter groups into a plurality of trend parameters to predict future performance of said communication device; and recommending a performance rating in terms of capacity or size for said communication device based upon said plurality of trend parameters, wherein said performance rating corresponds to a port speed of a port residing in said communications device, wherein said port speed corresponds to the rate at which data is transmitted through said port.

27. A system for determining and predicting performance and recommending a configuration of a communication device, comprising:

a user interface, wherein a user specifies a reporting period, said reporting period defining a reporting period of interest, and said user specifies a plurality of summary periods, each said summary period corresponding to a different portion of said reporting period, and wherein each said summary period corresponds to a at least one day of interest and to at least a portion of said day of interest; and a processor, wherein said processor detects a plurality of selected data parameters from said communications device such that said plurality of selected data parameters corresponds to said plurality of summary periods, and wherein said processor processes said plurality of selected data parameters into a plurality of per-summary-period performance parameter groups, each group corresponding to actual performance of said communication device during one of said summary periods, and wherein said processor trends said plurality of per-summary-period performance parameter groups into a plurality of trend parameters to predict future performance of said communication device, and wherein said processor recommends a performance rating in terms of capacity or size for said communication device based upon said plurality of trend parameters, wherein said performance rating corresponds to a port speed of a port residing in said communications device, wherein said port speed corresponds to the rate at which data is transmitted through said port.

28. A system for determining and predicting performance and recommending a configuration of a communication device, comprising:

means for collecting a plurality of data parameters from said communication device;

means for storing said data parameters;

means for specifying a reporting period, said reporting period corresponding to a reporting period of interest;

means for specifying a plurality of summary periods, each said summary period defining a different portion of said reporting period, and wherein each said summary period corresponds to a at least one day of interest and to at least a portion of said day of interest;

means for retrieving a plurality of selected data parameters from said storing means, said plurality of selected data parameters corresponding to said plurality of summary periods;

means for processing said plurality of selected data parameters into a per-summary-period performance parameter groups, each group corresponding to actual performance of said communication device during one of said summary periods;

means for trending said plurality of per-summary-period performance parameter groups into a plurality of trend parameters to predict future performance of said communication device;

means for recommending a performance rating in terms of capacity or size for said communication device based upon said plurality of trend parameters, wherein said performance rating corresponds to a port speed of a port residing in said communications device, wherein said port speed corresponds to the rate at which data is transmitted through said port; and means for presenting said plurality of processed performance parameters and said plurality of trend parameters in a trend report.

29. A method for determining and predicting performance and recommending a configuration of a communication device, the method comprising the steps of:

collecting a plurality of data parameters from said communication device;

storing said data parameters;

specifying a reporting period, said reporting period corresponding to a reporting period of interest;

specifying a plurality of summary periods, each summary period defining a different portion of said reporting period, and wherein each said summary period corresponds to a at least one day of interest and to at least a portion of said day of interest;

retrieving a plurality of selected data parameters from storage, said plurality of selected data parameters corresponding to said plurality of summary periods;

processing said plurality of selected data parameters into a plurality of per-summary-period performance parameter groups, each group corresponding to actual performance of said communication device during each of said summary periods;

trending said plurality of per-summary-period performance parameter groups into a plurality of trend parameters to predict future performance of said communication device;

recommending a performance rating in terms of capacity or size for said communication device based upon said plurality of trend parameters, wherein said performance rating corresponds to a port speed of a port residing in said communications device, wherein said port speed corresponds to the rate at which data is transmitted through said port;

presenting said plurality of processed performance parameter groups and said plurality of trend parameters in a trend report; and displaying said trend report.

30. A transmitter having a built-in capability for determining and predicting performance and recommending a configuration, comprising:

a user interface, wherein a user specifies a reporting period, said reporting period corresponding to a reporting period of interest, and said user specifies a plurality of summary periods, each summary period defining a different portion of said reporting period, and wherein each said summary period corresponds to a at least one day of interest and to at least a portion of said day of interest;

a processor, wherein said processor retrieves a plurality of selected data parameters such that said plurality of selected data parameters corresponds to said plurality of summary periods, and wherein said processor processes said plurality of selected data parameters into a plurality of per-summary-period performance parameter groups each group corresponding to actual performance of said transmitter during one of said summary periods, and wherein said processor trends said plurality of per-summary-period performance parameter groups into a plurality of trend parameters to predict future performance of said transmitter, and wherein the processor recommends a performance rating in terms of capacity or size for said transmitter based upon said plurality of trend parameters, wherein said performance rating corresponds to a port speed of a port residing in said transmitter, wherein said port speed corresponds to the rate at which data is transmitted through said port; and a data presentation module, wherein said module presents said plurality of processed performance parameters and said plurality of trend parameters in a trend report.

31. A receiver having a built-in capability for determining and predicting performance and recommending a configuration, comprising:

a user interface, wherein a user specifies a reporting period, said reporting period corresponding to a reporting period of interest, and said user specifies a plurality of summary periods, each summary period defining a different portion of said reporting period, and wherein each said summary period corresponds to a at least one day of interest and to at least a portion of said day of interest;

a processor, wherein said processor retrieves a plurality of selected data parameters such that said plurality of selected data parameters corresponds to said plurality of summary periods, and wherein said processor processes said plurality of selected data parameters into a plurality of per-summary-period performance parameter groups, each group corresponding to actual performance of said receiver during each of said summary periods, and wherein said processor trends said plurality of per-summary-period performance parameter groups into a plurality of trend parameters to predict future performance of said receiver, and wherein said processor recommends a performance rating in terms of capacity or size for said receiver based upon said plurality of trend parameters, wherein said performance rating corresponds to a port speed of a port residing in said receiver, wherein said port speed corresponds to the rate at which data is received through said port;

a data presentation module, wherein said module presents said plurality of processed performance parameter groups and said plurality of trend parameters.

* * * * *